United States Patent [19]
Norris

[11] Patent Number: 5,719,567
[45] Date of Patent: Feb. 17, 1998

[54] SYSTEM FOR ENHANCING NAVIGATION AND SURVEILLANCE IN LOW VISIBILITY CONDITIONS

[75] Inventor: Victor J. Norris, Ellicott City, Md.

[73] Assignee: Victor J. Norris, Jr., Ellicott City, Md.

[21] Appl. No.: 453,720

[22] Filed: May 30, 1995

[51] Int. Cl.[6] ............................................. B64F 1/18
[52] U.S. Cl. .................. 340/953; 250/372; 340/952; 340/956; 342/33; 359/154
[58] Field of Search ................................ 340/947, 948, 340/952, 953, 956; 73/178 T; 342/33; 250/372, 504 R; 359/154, 169; 356/152.3

[56] References Cited

U.S. PATENT DOCUMENTS

| | | | |
|---|---|---|---|
| 2,896,089 | 7/1959 | Wesch . | |
| 3,005,197 | 10/1961 | Shearer . | |
| 3,130,310 | 4/1964 | Biberman et al. | 250/372 |
| 3,299,769 | 1/1967 | Byers | 340/952 |
| 3,324,471 | 6/1967 | Rover . | |
| 3,510,834 | 5/1970 | Durand | 340/972 |
| 3,580,996 | 5/1971 | Maxey . | |
| 3,631,252 | 12/1971 | Gebel . | |
| 3,716,860 | 2/1973 | Bechtel . | |
| 3,736,428 | 5/1973 | Monroe | 250/372 |
| 3,781,560 | 12/1973 | Deburgh et al. . | |
| 3,855,571 | 12/1974 | Massa | 340/943 |
| 3,896,432 | 7/1975 | Young . | |
| 3,940,630 | 2/1976 | Bergonz | 250/372 |
| 3,999,007 | 12/1976 | Crane . | |
| 4,063,218 | 12/1977 | Basov et al. . | |
| 4,129,780 | 12/1978 | Laughlin . | |
| 4,196,346 | 4/1980 | McElhannon | 340/953 |
| 4,209,768 | 6/1980 | Basov et al. . | |

(List continued on next page.)

OTHER PUBLICATIONS

Michael Muehlemann, "Tungsten Halogen for Illumination", *The Photonics Design and Applications Handbook*, 1993, pp. H-329 to H-330.

Cooper Industries Product Brochure, "HRLQ High Intensity Runway Light/Quartz", Mar. 1991.

Godfrey Engineering Product Brochure, "Reils Three Intensity Model GE3836-0003", Undated.

Applications, Accessories & Support Brochure, "UV-Sensitive Solar Blind Photo Multiplier Tubes", EMR Photoelectric, Undated.

Schlumberger Product Brochure, "Custom Designed Microchannel [Late Tubes]", Undated.

*Primary Examiner*—Brent A. Swarthout
*Attorney, Agent, or Firm*—J. De La Rosa

[57] ABSTRACT

A system for enhancing navigation or surveillance in low visibility conditions is realized by employing one or more ultraviolet radiation sources, a receiver which is capable of producing output signals from which a two dimensional image of the received radiation can be constructed, and a display device for displaying such image. In one preferred embodiment the ultraviolet radiation source is co-positioned with a critical marker such as a runway beacon or hazard beacon. The ultraviolet radiation emanates from the source, preferably modulated to form a repetitive, characteristic signal, propagates through the low visibility atmosphere, and received by the ultraviolet imaging receiver. In another preferred embodiment, an ultraviolet radiation source is placed at or near the ultraviolet imaging receiver, that is, onboard the same vehicle or at the same fixed location. One or more reflectors are co-positioned with the critical markers. The reflector reflects or redirect an ultraviolet radiation signal, received from the source, back through the low visibility atmosphere to the ultraviolet imaging receiver whereby an image of the received radiation is presented to an operator by a display device. In another preferred embodiment, the reflector may be replaced with a transponder. The present invention permits a pilot, vehicle operator, air traffic controller, or other operator to perform navigation or surveillance tasks in low visibility conditions in similar manner to that employed under clear weather conditions.

57 Claims, 14 Drawing Sheets
(1 of 22 Drawing(s) in Color)

U.S. PATENT DOCUMENTS

| | | | |
|---|---|---|---|
| 4,249,158 | 2/1981 | Basov et al. | |
| 4,259,658 | 3/1981 | Basov et al. | |
| 4,328,516 | 5/1982 | Colpack et al. | |
| 4,359,640 | 11/1982 | Geiger | 250/372 |
| 4,411,487 | 10/1983 | Miller et al. | |
| 4,493,114 | 1/1985 | Geller et al. | 250/372 |
| 4,667,196 | 5/1987 | Kaul | 340/9.54 |
| 4,707,595 | 11/1987 | Meyers | 250/504 R |
| 4,925,303 | 5/1990 | Pusic | 356/152 |
| 4,940,986 | 7/1990 | Huguenin | 342/410 |
| 5,021,668 | 6/1991 | Talmore et al. | 250/372 |
| 5,043,726 | 8/1991 | Shifrin | 340/953 |
| 5,149,959 | 9/1992 | Collins et al. | 250/226 |
| 5,168,152 | 12/1992 | Kelley | 250/372 |
| 5,202,692 | 4/1993 | Huguenin et al. | 342/351 |
| 5,218,360 | 6/1993 | Goetz et al. | 342/35 |
| 5,307,194 | 4/1994 | Hatton et al. | 250/504 R |

1 MILE OUT

1/2 MILE OUT

1/4 MILE OUT

1 MILE OUT

1/2 MILE OUT

1/4 MILE OUT

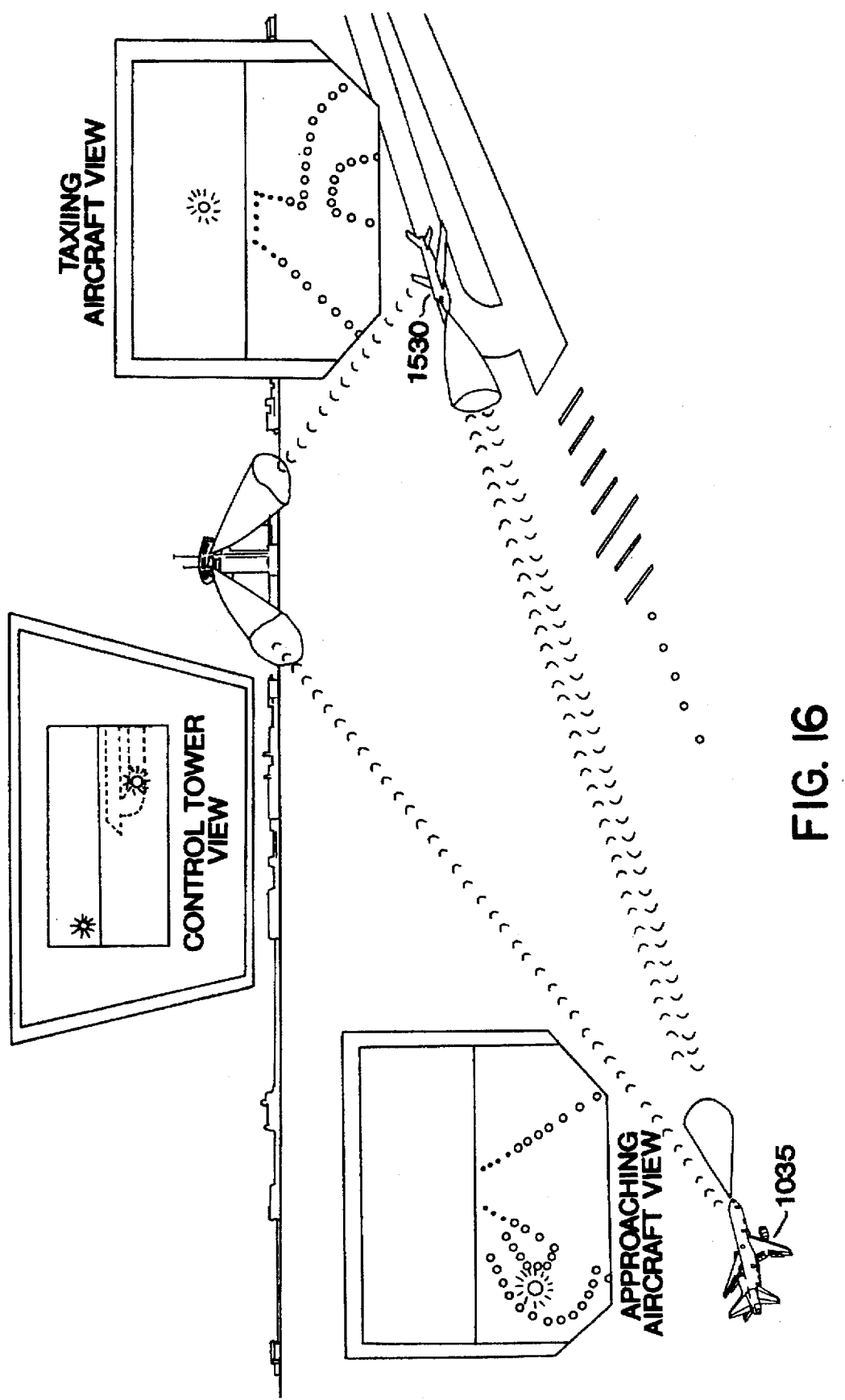

SYSTEM FOR ENHANCING NAVIGATION AND SURVEILLANCE IN LOW VISIBILITY CONDITIONS

TECHNICAL FIELD

This invention relates to a system for enhancing navigation or surveillance, and more particularly, to a system for providing the location and characteristics of relevant objects and/or areas, such as aircraft and runway lights, useful under low visibility conditions.

BACKGROUND OF THE INVENTION

Under clear weather conditions, light propagates through the atmosphere with only a slight loss due to absorption and scattering. However, when aerosols and molecules that contribute to various adverse weather conditions, such as fog, rain, or snow, are present in the atmosphere in sufficient number, they may absorb and scatter light to the extent that the losses are significant and the visibility is seriously degraded. In various situations, such visibility can present costly disruptions and a dangerous lack of information concerning the location and characteristics of critical objects and/or areas.

In the prior art, systems have been used to supplement the human eye in locating and perceiving objects and/or areas under adverse weather conditions. Ideally, such systems possess the ability to "penetrate" the weather, that is, provide information on the location and characteristics of the desired objects and/or areas to an operator in the same context as that obtainable in clear weather.

Such systems are of particular importance to aviation where poor visibility conditions develop spontaneously and demand time critical reaction. Despite sophisticated and costly avionics, weather conditions still impose limitations on final approaches to landing. These limitations account for the capabilities of the aircraft, the pilot and the equipment installed at the airport. Each set of capabilities is associated with a minimum ceiling and a minimum runway visibility before landing is permitted. Operating under instrument flight rules (IFR), a pilot can be guided to a specified distance from the runway by indications of glide-path deviations presented on the aircraft's instrument panel. Such glide-path deviations are typically provided by landing guidance systems, such as instrument landing systems (ILS), microwave landing systems (MLS) or global positioning systems (GPS/GNSS) that are linked to the aircraft via radio frequency (RF) transmissions. If at a specified distance, the pilot is unable to see the characteristics of the runway as set by the FAA, the pilot must execute a missed approach. To minimize these incidents, air traffic controllers frequently re-route the aircraft or do not provide takeoff clearance to an aircraft destined for an affected airport. Whatever the alternative, these procedures prompt anxiety in the passengers and flight crews, impose additional expense, result in delays and scheduling disruptions, and reduce operational safety margins.

As visibility degrades and landing conditions transform from Category I, through Category II, to various grades of Category III, the pilot's capability to operate the aircraft is augmented by increasing levels of equipment sophistication. This accommodation is in recognition of a more demanding criteria for the required navigation performance (RNP) as runway visual range decreases. One level of equipment sophistication involves an autopilot that aids in the operation of the flight controls. Ideally, in Category III conditions, the glide path deviations can be directly coupled to the aircraft through the autopilot such that the aircraft descends to the runway and flares automatically with the pilot "out of the loop." In actual practice, however, this "out of the loop" mode is seldom invoked due to the high cost of implementation. The RNP in this instance imposes stringent certification criteria in terms of integrity, availability, continuity of service, and accuracy. Equipment cost and maintenance, as well as continued proficiency training necessary for compliance, limit its cost effectiveness.

A variety of systems have attempted to solve the inherent disadvantages of RF linked, guidance error based systems. One of the simplest approaches is the use of pulsed, intense white beacons for runway approach and threshold indications. While beneficial for long range detection, this approach has proved to be detrimental at close ranges, especially in dense fog. On a short final approach, the intense white beacons generally blind the pilot and fail to provide any spatial orientation due to atmospheric diffusion at visible wavelengths.

Active optical imaging systems that illuminate and display areas of interest have also been evaluated as navigation aids. These systems typically have pulsed transmitters and collocated, gated imaging receivers. The receivers are synchronously gated so that they do not see backscatter from out-bound transmitter pulses. Current complementary transmitter/receiver pairs operate at wavelengths between the visible and the near infrared. Their operation depends on the reflection contrast between an object and its background. Such systems inherently have a small field of view, operate at low transmitter pulse rates, or require long integration periods. Resulting information rates are too low and the data displayed is too limited for effective, real time "pilot in the loop" operation.

A number of systems operating in the microwave, infrared, and millimeter wave (MMW) regions of the electromagnetic spectrum have been considered as adverse weather navigation aids. Each takes advantage of the reduced atmospheric attenuation windows at these longer than visible wavelengths.

Microwave radiation offers an attractive means to penetrate a low visibility atmosphere. However, the range-azimuth scan techniques typically employed to generate a scene and the long operating wavelengths combine to provide information rates, resolution and azimuth-elevation display solutions that are inadequate for real time pilot use as a landing aid.

Infrared systems operating at wavelengths two to twenty times longer than visible wavelengths offer a resolution comparable to the human eye as well as provide real-time information presented directly in azimuth-elevation coordinates. Under haze conditions and against a terrain background, infrared sensors operating at wavelengths between 8–12 µm generally provide a better image than the human eye. However, as weather conditions degrade, their imaging performance for a visibility less than one-half mile abruptly deteriorates to levels well below that of the human eye. Detection capability is also weather limited. Detection is dependent on the radiant temperature difference between an object of interest and its background. In many instances, this apparent difference is less than the sensitivity of practical state-of-the-art sensors (~0.01 C.°). This can be attributed to environmental conditions, such as the twice daily occurrence of temperature contrast reversal, or the atmospheric contrast degradation at high humidities that typically accompany fog conditions. As such, the capabilities of infrared systems are generally the least effective when they are the most needed.

Infrared systems operating at about 1 μm have been considered to lessen the effects of these contrast degradation factors by detecting active rather than passive objects. For example, the characteristic blackbody radiation from incandescent lamp filaments is detectable by these infrared systems. This direct radiation could be detected by the long wavelength radiation emitted by the heated globe that encloses the filament. However, the magnitude of the solar background radiation at 1 μm can be as much as 70 db greater than that of the filament radiation. An intra-scene dynamic range of about 70 db is therefore required to pull the filament signal out of the background. This process requires elaborate signal-background convolutions that are expensive and difficult to obtain in real time. Moreover, the low solar background advantage gained by operating in the conventional 3–5 or 8–11 μm windows is lost.

Prior art systems employing millimeter wave (MMW) radiation have typically been the best candidates for use in adverse weather. It is well known that radiation between 30–300 GHz (10–1.0 mm) penetrates fog and other atmospheric constituents with relatively modest attenuation. Typically, these systems operate at 35 or 94 GHz where fog penetration is at its greatest. See generally Young et al., "Passive Millimeter-wave Imaging," *TRW Space & Defense Quest*, Winter 1990/91. Millimeter wave systems, however, generally suffer from some serious disadvantages. Their performance is degraded in rain, their resolution is inferior to visible sensors, and their hardware mechanization is complex. Some millimeter wave systems operate according to conventional radar scanning principles. The capabilities of these systems are inherently limited at short final approach ranges when performance is most demanding for aircraft landings.

MMW systems using alternative imaging techniques are generally limited in sensitivity and require prolonged dwell times, rendering them ill-suited to the dynamic environment encountered in the short final phase of landing. Heterodyning has been considered as a means to increase sensitivity. However, this gain is realized at the significant expense in component complexity. Additionally, because of the long wavelengths involved, millimeter wave systems produce limiting angular resolutions—six times inferior to that of the human eye.

Although RF-linked, guidance error based systems provide a desired immunity to weather, they lack system simplicity as well as compatibility for "pilot in the loop" operation during landing. Imaging based systems in turn are simpler and accommodate the pilot, but lack adequate weather performance. Mixed RF-linked, earth mapping systems and stored data based systems have also been developed. They are generally known in the art as synthetic vision systems, but have not been accepted due their complexity and lack of a real time, credible image anchored to the runway.

Accordingly, there still exits a need for a system that provides a compatible combination of characteristics that permits a full range of operation in adverse weather environments, including real time "in the loop" operation and resolution comparable to that of the human eye. Advantageously, such systems would, for example, allow operators to navigate over local regions in low visibility conditions in a manner similar to the way those functions are performed under clear weather conditions.

SUMMARY OF THE INVENTION

A system for providing the location and characteristics of relevant objects and/or areas, such as aircraft and runway lights, useful under low visibility conditions is realized by employing ultraviolet radiation. It has been discovered that the atmospheric propagation characteristics of low visibility atmospheres permit the propagation of radiation in the ultraviolet with sufficiently low attenuation and scattering for use in various applications. Furthermore, operation in the "solar blind" region of the ultra-violet radiation, where there is an absence of solar background radiation, allows a system to image and/or locate critical markers or areas having associated ultraviolet radiation sources because of the high signal-to-noise ratio afforded through the use of high gain imaging tubes.

A system in accordance with the principles of the present invention comprises one or more ultraviolet radiation sources, a receiver which is capable of producing an image or representation of the received radiation, and a display. In one preferred embodiment, ultraviolet radiation sources are co-positioned with critical markers, such as runway beacons or hazard annunciators. The ultraviolet radiation emanates from the source, preferably modulated to form a repetitive, characteristic signal, propagates through the low visibility atmosphere, and is received by the receiver. The receiver may be positioned on a vehicle such as an aircraft, or fixed at a particular location such as a control tower. The receiver produces an image or representation of the received radiation and thereby the critical markers which is then passed to a display device. The display device is preferably a transparent head-up display upon which the image or representation can be superimposed on the real-scene visible image when available to an operator.

In another preferred embodiment, the source is placed at or near the receiver, that is, onboard the same vehicle or at the same fixed location. Retroreflectors are remotely co-positioned with the critical markers. Modulated ultraviolet radiation is transmitted by the source and propagates through the low visibility atmosphere to each retroreflector. The retroreflector reflects the ultraviolet radiation signal back through the low visibility atmosphere to the receiver whereupon an image or representation of the received radiation is presented to an operator by a display device.

In another embodiment, the retroreflectors may be replaced with transponders. When each transponder receives the ultraviolet radiation from the source, it transmits differently modulated ultraviolet radiation back to the receiver. Each transponder may transmit a unique signal, so that different types of critical markers can be readily distinguished and displayed to the operator.

A system in accordance with the principles of the present invention enables a pilot, vehicle operator, air traffic controller, or other operator to perform a task in low visibility conditions caused by fog, rain, or snow, in much the same manner as he would in clear weather. Specifically, this feature is achieved by combining the image or representation generated by the present invention with the real-scene visible view. When an object or target area of interest marked by a critical marker, such as a beacon, cannot be observed due to low visibility conditions, an ultraviolet radiation signal at the same location, generated by a source or from a transponder, is detected and displayed to the operator at the same location where the critical marker would be viewed through a clear atmosphere. This one-to-one mapping can be extended to a field of sources, reflectors or transponders that form a pattern that duplicates an existing visible pattern and can then be displayed in lieu of or in concert with the visible pattern.

BRIEF DESCRIPTION OF THE DRAWINGS

A more complete understanding of the invention may be obtained by reading the following description in conjunction with the appended drawings in which like elements are labeled similarly and in which:

FIG. 16 is a pictorial representation of the use of a system in accordance with the present invention to deter runway incursions in low visibility conditions.

DETAILED DESCRIPTION

A system for providing the location and characteristics of relevant objects and/or areas in a low visibility atmosphere, useful in enhancing navigation or surveillance, is realized by employing ultraviolet radiation in the "solar blind" region. Advantageously, it has been discovered that radiation in this radiation spectrum effectively propagates in a low visibility atmosphere for use in real-time image acquisition applications. Although the prior art suggests otherwise, it has been discovered that the ozone absorption in the solar blind region is substantially reduced in a low visibility atmosphere. Secondly, ultraviolet radiation in a low visibility atmosphere propagates and/or scatters substantially in a forward direction. Advantageously, these discoveries coupled with the absence of solar background radiation in that spectrum allows the present invention to image and/or locate critical markers or areas having associated low power ultraviolet radiation sources because of the high signal-to-noise ratio afforded through the use of high gain imaging tubes.

The present invention provides distinct advantages over other currently available technologies. The short wavelength of the ultraviolet radiation permits the present system to achieve angular resolutions which are comparable to that of the human eye, a feature that systems employing long wavelengths, such as millimeter wave systems, cannot achieve. Receiver information rates are compatible with the construction of systems that can produce real-time images corresponding to the real-time scenes. This aspect permits full "in-the-loop" control. Whereas the performance of most current systems degrades as visibility conditions worsen, the performance of the present invention actually improves in more severe conditions. The necessary components are also much smaller than the devices of other systems, permitting easy installation onto aircraft, boats, automobiles, and other vehicles. In addition, these components are inexpensive, simple, and readily available.

Without any loss of generality or applicability for the principles of the present invention, in some embodiments the description is directed to the aviation industry. It should be understood, however, that the present invention has many alternative applications. For instance, the present invention may be used in maritime navigation, surveillance, or search and rescue applications.

Figure 1:
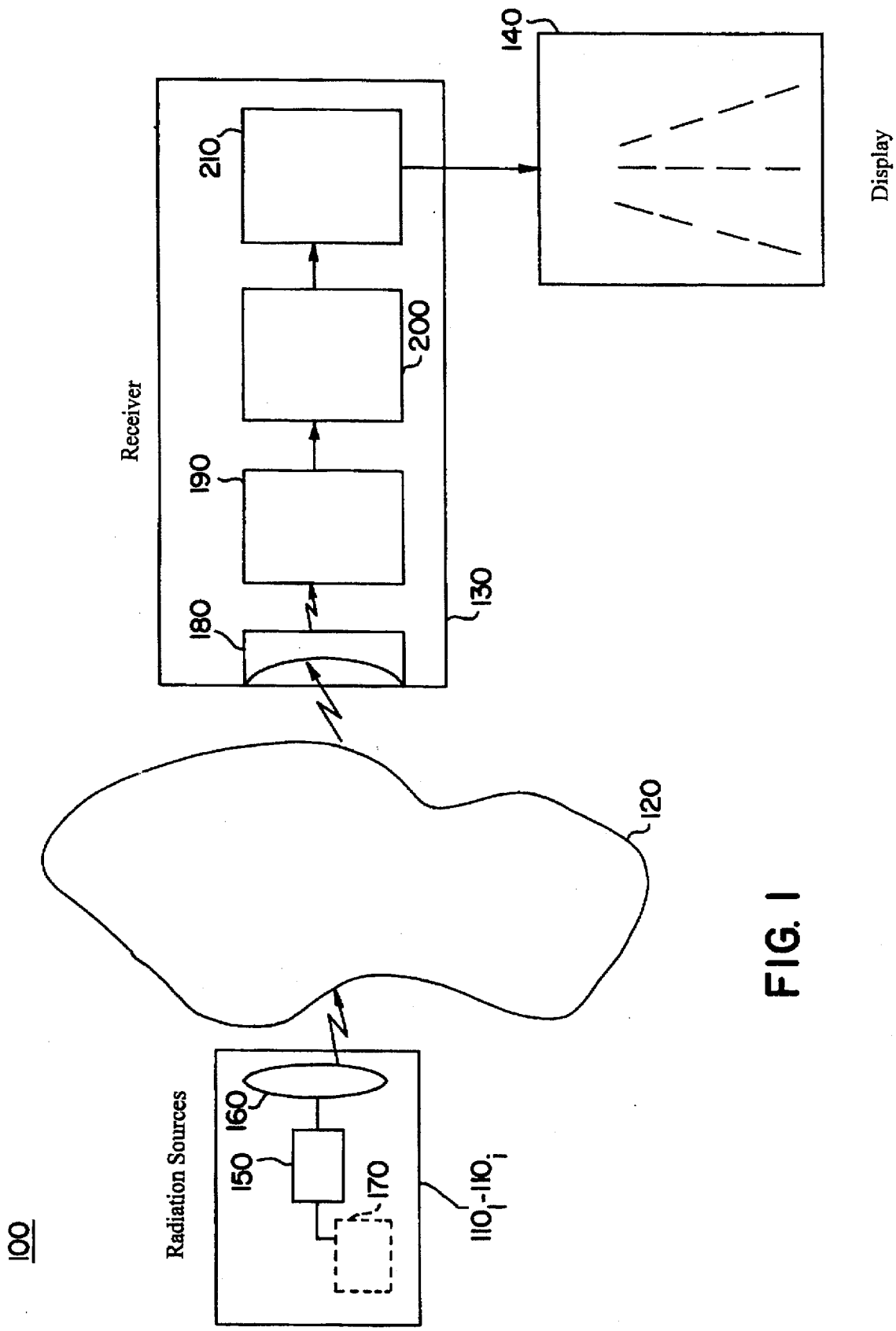
FIG. 1 is a detailed block diagram of a system in accordance with the principles of the present invention.

An exemplary block diagram of a system 100 in accordance with the principles of the invention is schematically shown in FIG. 1. Radiation sources $110_1$–$110_i$, co-positioned or integrated with critical markers of interest, generate ultraviolet radiation within the "solar blind" region (~0.205–0.275 μm). For example, sources $110_1$–$110_i$ can be located at or near visible beacons or lights, such as runway lights. In operation, the emitted radiation propagates through a low visibility atmosphere 120, such as fog, to a receiver 130. Receiver 130 detects the incident ultraviolet radiation, while filtering out unwanted radiation from elsewhere in the spectrum. As low visibility conditions occur and obscure the location of the critical markers, an image or representation of the markers can still be acquired and then displayed because the ultraviolet radiation penetrates through low visibility atmosphere 120.

Each source $110_1$–$110_i$ includes an ultraviolet lamp 150, beam forming optics 160 and a modulator 170. Lamp 150 may be constructed from a variety of light sources, such as xenon and mercury flashlamps which emit radiation in the desired ultraviolet spectrum. Alternatively, UV lasers, such as a frequency doubled Nd:YAG laser may be used. In the latter case, electro-optical or mechanical scanners may be used to direct the laser radiation along a desired solid angle.

Figure 2:
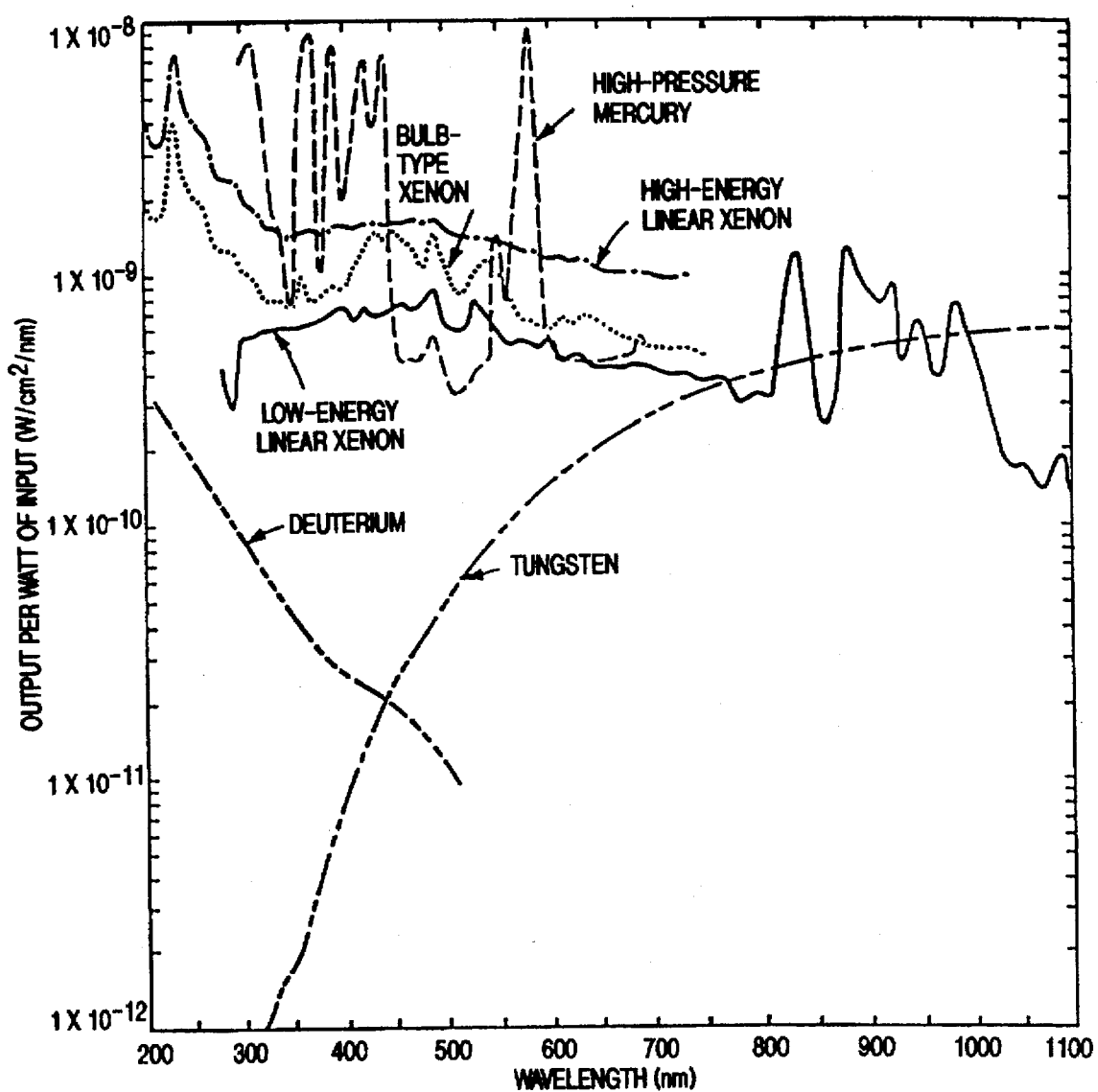
FIG. 2 depicts the spectral characteristics of a variety of ultraviolet sources.

FIG. 2 includes typical plots of the spectral characteristics of several light sources that may be used for lamp 150. Preferably, lamp 150 emits radiation between 0.205 μm–0.275 μm over a broadband wavelength spectrum or at discrete wavelengths. Preferably, modulator 170 modulates the radiation generated by lamp 150 to form a repetitive, characteristic radiation pattern which can be use to distinguish it from other possible sources of ultraviolet radiation. Optics 160 is used to direct the ultraviolet radiation within a desired solid angle of illumination.

Receiver 130 comprises a lens 180, an optical filter 190, an imaging tube 200 and a signal processor 210. The field of view (FOV) of lens 180 is preferably 30° horizontally and 22.5° vertically, but these values can vary from a few degrees to 120°. Lens 180 made of UV quartz or other UV transmissive material is typically 1"–4" in diameter which compares favorably with the 12"–24" diameter lenses required by millimeter wave systems. The angular resolution of receiver 130 is generally comparable to that of the human eye, typically about 1–2 mrads.

Figure 3:
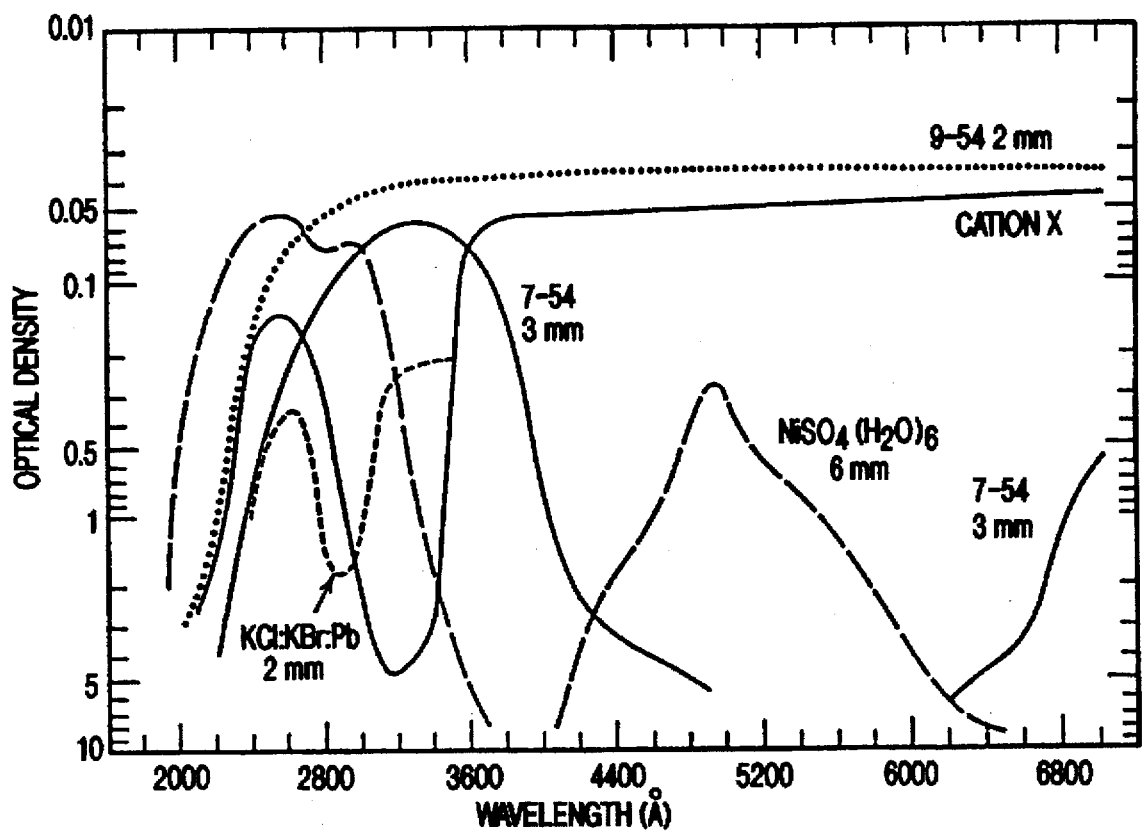
FIG. 3 is a plot of the transmission characteristics of a variety of absorption filter materials which may be used in the optical filter of FIG. 1.

Optical filter 190 is a bandpass filter that passes radiation at wavelengths approximately between 0.205 μm–0.275 μm. Substantial roll-off is used to attenuate solar radiation at wavelengths above 0.275 μm. Preferably, filter 190 attenuates about an order of magnitude per nanometer between ~0.275 μm–0.290 μm. It is contemplated that filter 190 may comprise absorption bandpass filters and/or comprise reflective filters in cascade. Various materials can be used. For example, filter 190 may be partially constituted from $NiSO_4$ $(H_2O)_6$ and Cation X which have response characteristics as shown in FIG. 3. See *The Middle Ultraviolet* by A. E. S. Green, John Wiley & Sons, New York (1966). Alternatively, narrow bandpass filters or interference filters may be used, which are well known in the art, such as for use with narrow line emission sources, such as lasers. Also, dichroic mirrors and multilayer coated mirrors may be used to reflect only the radiation spectrum of interest to imaging tube 200.

Preferably, imaging tube 200 is a "solar blind" microchannel plate photomultiplier tube (MCP), such as the MCPT manufactured by EMR Photoelectric of Princeton, N.J., which operates at or near the theoretical limit of sensitivity. Other suitable high gain imaging detectors may be used, such as solid state CCDs, image intensifiers and the like. Although solid state CCDs do not posses the same sensitivity, they may be suitable at shorter ranges where the radiation intensity is substantially at a higher level. CCDs, for example, may also be used in conjunction with the MCPs to achieve system redundancy necessary for aviation. In the event of malfunction, CCDs can be used at short ranges in the final critical moments of landing, thereby providing graceful system degradation rather than catastrophic failure.

Those skilled in the art will readily note that an MCP is an image tube which detects a radiant image by counting individual photons and registering their spatial relationship. Because the system operates in the "solar blind" region where there is substantially no solar background radiation, this method of detection affords a high signal-to-noise ratio. Specifically, a MCP operates in the following manner. Radiant energy is focused on a photocathode which emits primary electrons to a parallel array of glass cylinders about 10 μm in diameter and 1 mm in length. The inside walls of the cylinders are coated with a secondary emitting material. The primary electrons strike the inside Walls near the entrance end and cause secondary electrons to be emitted. These secondary electrons in turn strike the wall further into the depth of the cylinder and create additional secondary electrons. This cascading mechanism produces a high, noise-free gain, typically on the order of $10^6$. For a more complete description of ultraviolet microchannel plates see C. B. Johnson et al., "Ultraviolet Sensing Technology Developments at ITT", *SPIE Ultraviolet Technology*, 150–54 (1986); and the *RCA Electro-Optics Handbook*, RCA Solid State Division, Lancaster, Pa. (1974).

Figure 4:
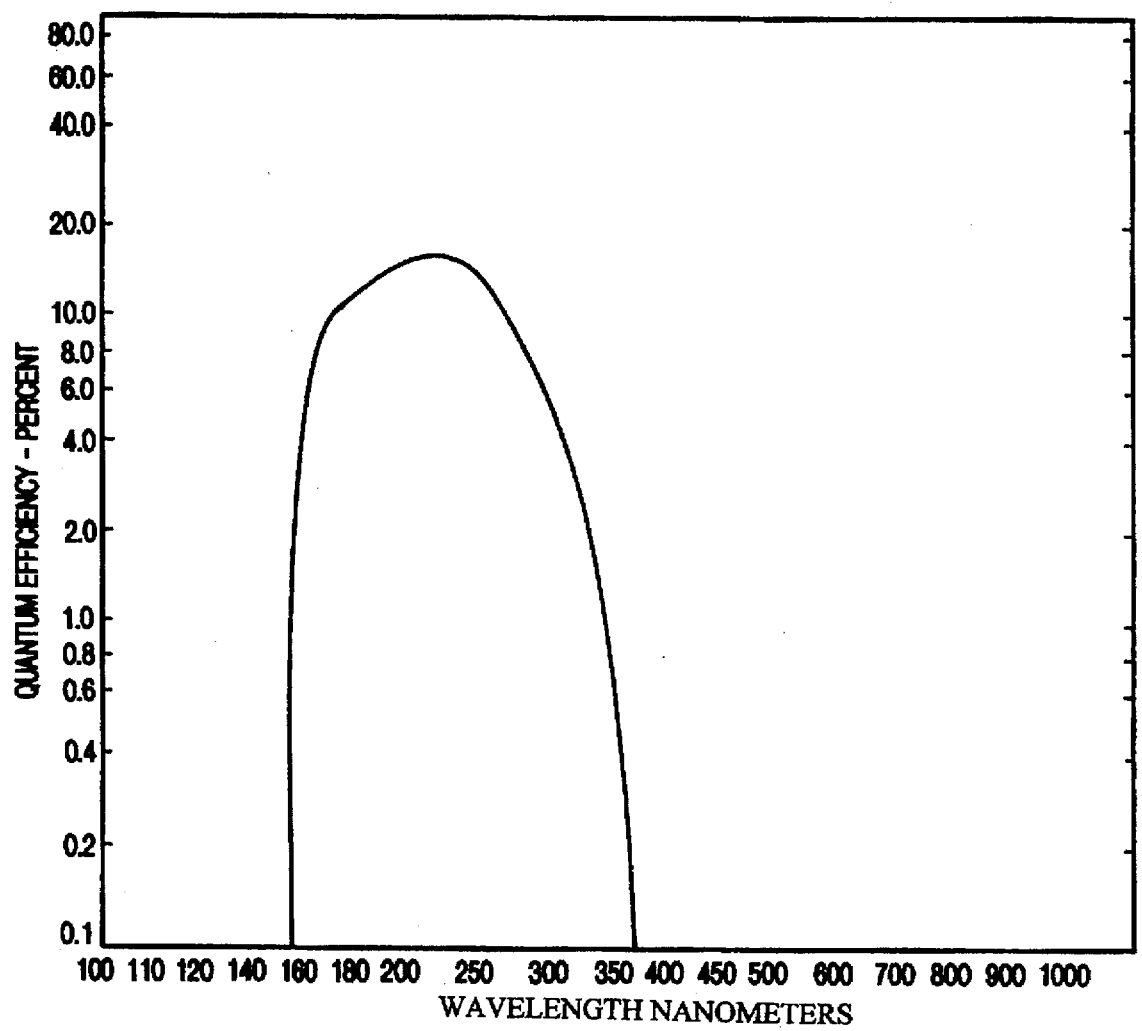
FIG. 4 is a plot of the spectral response characteristics of an ultraviolet microchannel plate photomultiplier tube.

Shown in FIG. 4 is a typical spectral response of imaging tube 200. Since there is a significant spectral response at wavelengths above 0.275 μm, the cutoff characteristics of optical filter 190 should be tailored to reject radiation above 0.275 μm so as to limit detection to the solar blind region. Imaging tube 200 generates an image or representation of sources $110_1$–$110_i$ at a resolution of ~512×512 pixels.

Those skilled in the art will appreciate the fact that due to the absence of solar background radiation at night the inherent spectral response of imaging tube 200 may obviate the need for filter 190. Accordingly, filter 190 may be automatically removed from the optical path of incident radiation through a mechanical or optical mechanism when solar background radiation is not detected. This can be effected through the use of a detector responsive to the characteristics of the solar background radiation.

Signal processor 210 processes the image from imaging tube 200 so as to filter out those undesired signals corresponding to radiation that is unmodulated, such as those generated from street lamps, fires, lightning flashes and the like. Signal processor 210 can also discern among signals corresponding to radiation modulated at different frequencies. Such modulation, either FM, PCM or AM, can be imposed on the ultraviolet sources associated with critical markers of interest so as to provide each with an identifying characteristic. Those identifying characteristics, for example, may be used to distinguish between hazard annunciators atop buildings, obstructions, and/or the color or type of the runway lights.

Information processed by signal processor 210 is fed to display 140 so that an image or representation of the desired critical markers can be displayed to an operator. Those skilled in the art will recognize that the image or representation of the sources produced from receiver 130 may be subject to a wide variety of image processing techniques. See *Digital Image Processing* by Pratt, John Wiley & Sons, New York (1978). Display device 140 is preferably a transparent head-up display, helmet-mounted sight, visor, or a device that displays the image or representation on a medium interposed between the operator's eye and his view of the actual, related scene. Alternatively, the image can be displayed on a monitor or integrated with the display of another sensor, such as a radar display.

Those skilled in the art will recognize that signal processor 210 may include a micro-processor based device, A/D converters, control logic, software, and other associated electronics. The construction of such devices is well known in the art and hence will not be discussed here.

Figure 5:
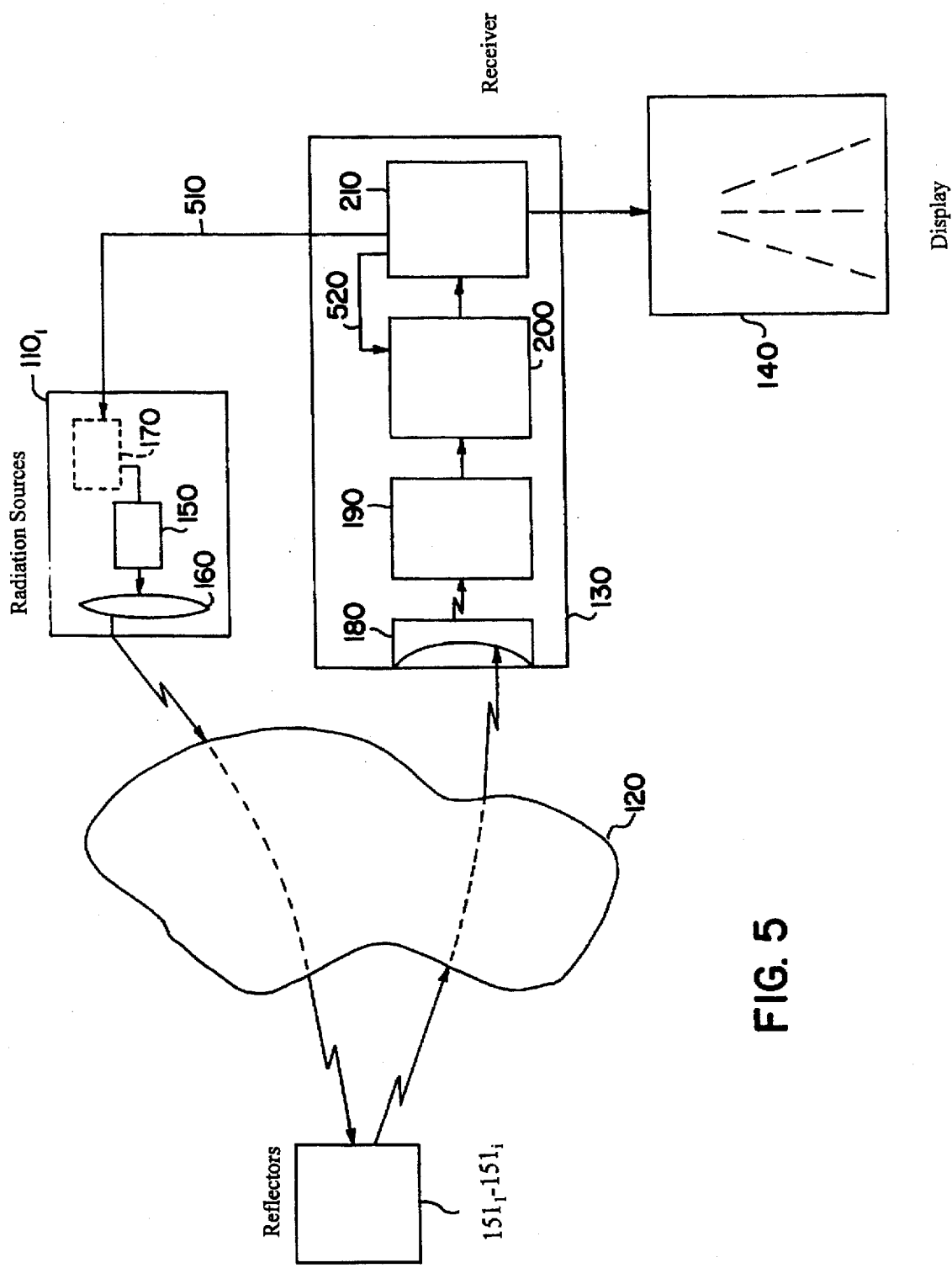
FIG. 5 is a detailed block diagram of another system in accordance with the principles of the present invention.

An alternative block diagram of a system in accordance with the principles of the invention is schematically shown in FIG. 5. This alternative embodiment is similar to that of FIG. 1, except that reflectors $151_1$–$151_j$ are co-positioned or integrated with the critical markers of interest. Likewise, radiation source $110_1$ generates ultraviolet radiation in the "solar blind" region. However, source $110_1$ is substantially co-located with receiver 130, rather than being separated by low visibility atmosphere 120.

In operation, radiation from source $110_1$ propagates through low visibility atmosphere 120 to reflectors $151_1$–$151_j$. Each of reflectors $151_1$–$151_j$ reflects or redirects the radiation back through low visibility atmosphere 120. Receiver 130 detects that radiation and similarly produces an image or representation of the radiation from reflectors $151_1$–$151_j$, which is then displayed on display 140.

Because source $110_1$ and receiver 130 are located in close proximity to each other, such as on an aircraft, it is necessary to prevent receiver 130 from detecting backscatter from source $110_1$. Signal processor 210 can perform this task by gating source $110_1$ and receiver 130. When source $110_1$ is transmitting, signal processor 210 signals imaging tube 200 to cease or inhibit detection. This is accomplished through gate signal 520. When transmitting has ceased, gate signal 520 is removed shortly thereafter and imaging tube 200 detects the radiation from reflectors $151_1$–$151_j$. To facilitate gating, signal processor 210 can also signal modulator 170 through signal 510 to start transmission.

It is contemplated that reflectors $151_1$–$151_i$ may be retroreflectors. A retroreflector is a device which reflects radiation substantially back along the path of the incident radiation. Because receiver 130 and source $110_1$ are located in close proximity, any reflected radiation will be substantially detected by receiver 130. Retroreflectors may take many forms, such as corner cube prisms, spheres and the like.

It is also contemplated that incident radiation returning to receiver 130 can be modulated so as to enhance detection or impose other desired information thereon. This modulation, for example, can be effected through the use of mechanical, electrical or optical shutters which are well known in the art.

Alternatively, reflectors $151_1$–$151_i$ can be replaced with transponders that retransmit the incident radiation at a greater intensity level. Each transponder itself includes, for example, receiver 130 and source 110 and may be designed to modulate the radiation in accordance with additional information. For example, the ultraviolet radiation signal from source $110_1$ can be used to trigger each transponder to transmit a unique return radiation signal representing a different type of hazard or runway light. These different radiation signals can be distinguished by colors, shading, or other information on display device 140.

To more fully appreciate the principles of the present invention, it will be instructive to discuss briefly the propagation of electromagnetic radiation. Radiation from a source propagating through a gaseous atmosphere has an irradiance E given by:

$$E = T_a \frac{I}{R^2}$$

where I is the intensity of source radiation, R is the distance from the source, and $T_a$ is the atmospheric transmittance. $T_a$ ranges from unity which represents perfect transmittance to zero representing total extinction. This transmittance $T_a$ represents the decrease in radiant intensity due to absorption and scattering and is a function of many variables, including wavelength, path length, pressure, temperature, humidity, and atmospheric composition.

More specifically, the atmospheric transmittance $T_a$ is given by Beer's Law:

$$T_a = e^{-\alpha R}$$

where $\alpha$ is the spectral attenuation coefficient or "extinction coefficient." The extinction coefficient $\alpha$ is wavelength dependent and is a measure of the extent of absorption and scattering of the radiation by the atmosphere. See, *RCA Electro-Optics Handbook*, RCA Solid State Division, Lancaster, Pa. (1974).

Attenuation is the result of scattering and absorption. Scattering effects are produced by two principal mechanisms, scattering by air molecules, called "Rayleigh" scattering, and scattering by larger aerosol particles, referred to as "Mie" scattering. See *Principles of Optics* by Born and Wolf, Pergamon Press, New York (1975). Although a wide variety of constituents are responsible for absorption, the effects of ozone $O_3$ and oxygen $O_2$ are the most pronounced in the ultraviolet region of interest. Ozone absorption dominates in clear weather.

Figure 6:
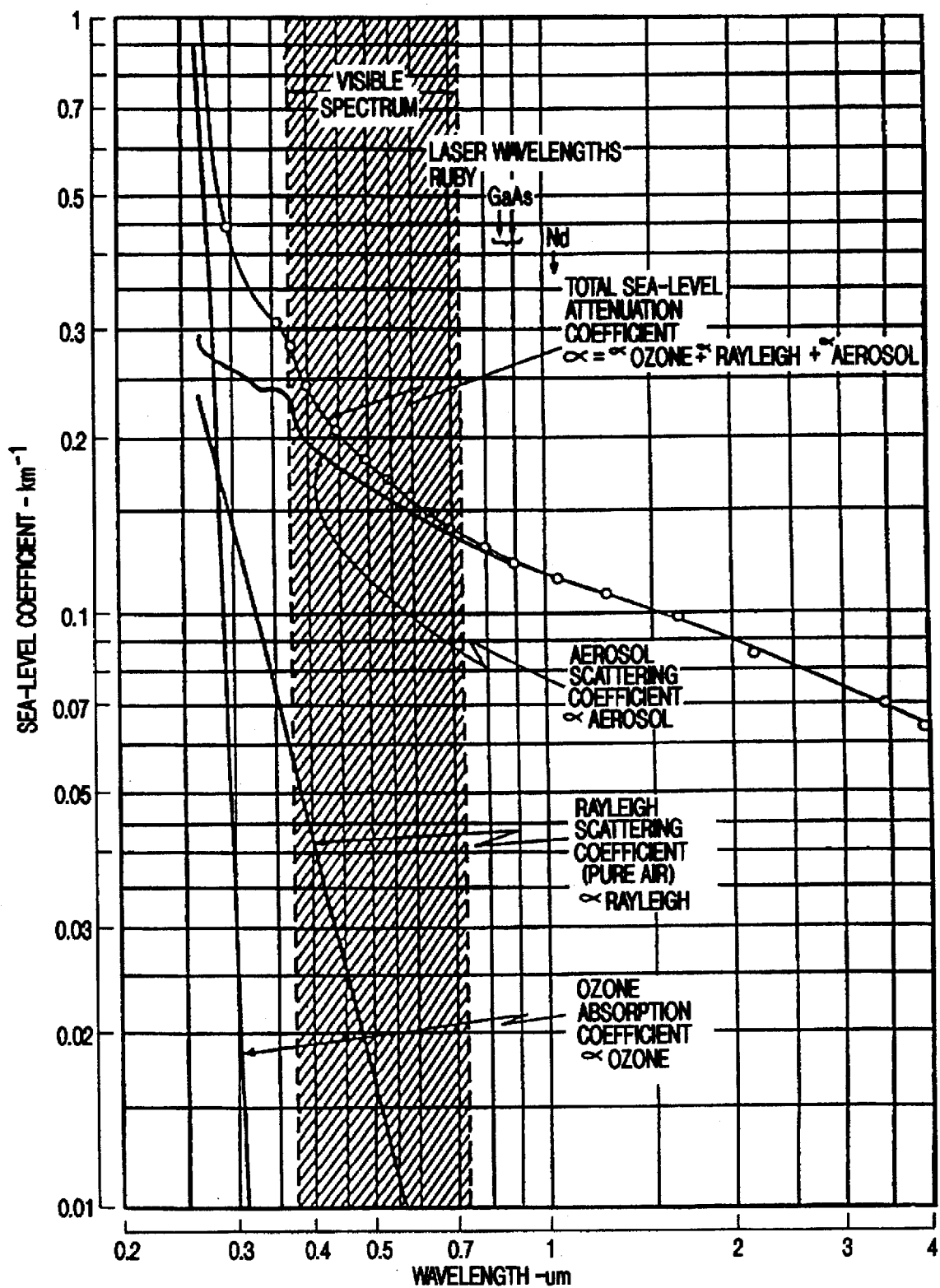
FIG. 6 is a plot of the sea-level extinction coefficient as a function of wavelength for Rayleigh scattering, Mie or aerosol scattering and ozone absorption in a model clear atmosphere.

The extinction coefficients for each source of attenuation can be determined separately. Shown in FIG. 6 is the sea-level extinction coefficient as a function of wavelength for Rayleigh scattering ($\alpha_{RAYLEIGH}$), aerosol scattering ($\alpha_{AEROSOL}$), and ozone absorption ($\alpha_{OZONE}$). The individual extinction coefficients sum to show the total extinction coefficient ($\alpha$) for the atmosphere. The amount of absorption and scattering occurring in the atmosphere, as measured by the extinction coefficient $\alpha$, has a profound effect on the visibility through the atmosphere.

From the extinction coefficient plots of FIG. 6, the prior art suggests that ultraviolet radiation will be more severely attenuated than visible radiation. Although ozone produces negligible attenuation in most areas of the electromagnetic spectrum, it is responsible for a dramatic absorption effect in the ultraviolet region. Below about 0.21 µm, oxygen significantly begins to contribute to the absorption.

A combination of various phenomena has been discovered that permits ultraviolet radiation to penetrate low visibility environments. First, it has been discovered that the ozone absorption effect is significantly reduced in fog which results when water molecules in the atmosphere condense to form small water droplets (10–20 µm in diameter) that remain suspended in the air. Water droplets that contribute to the adverse weather condition interact with the ozone molecules and break them down to molecular and atomic oxygen. Advantageously, this results in a reduction in that portion of the extinction coefficient attributable to ozone, $\alpha_{OZONE}$. Ozone in the local atmosphere will be further depleted as the adverse weather condition, and therefore the visibility, worsens. In other words, the ozone absorption in the ultraviolet region reduces as visibility conditions become more severe. Further, the fact that ozone naturally decomposes at night, reaching a minimum in the morning when low visibility conditions are most prevalent can be used to an advantage.

Figure 7:
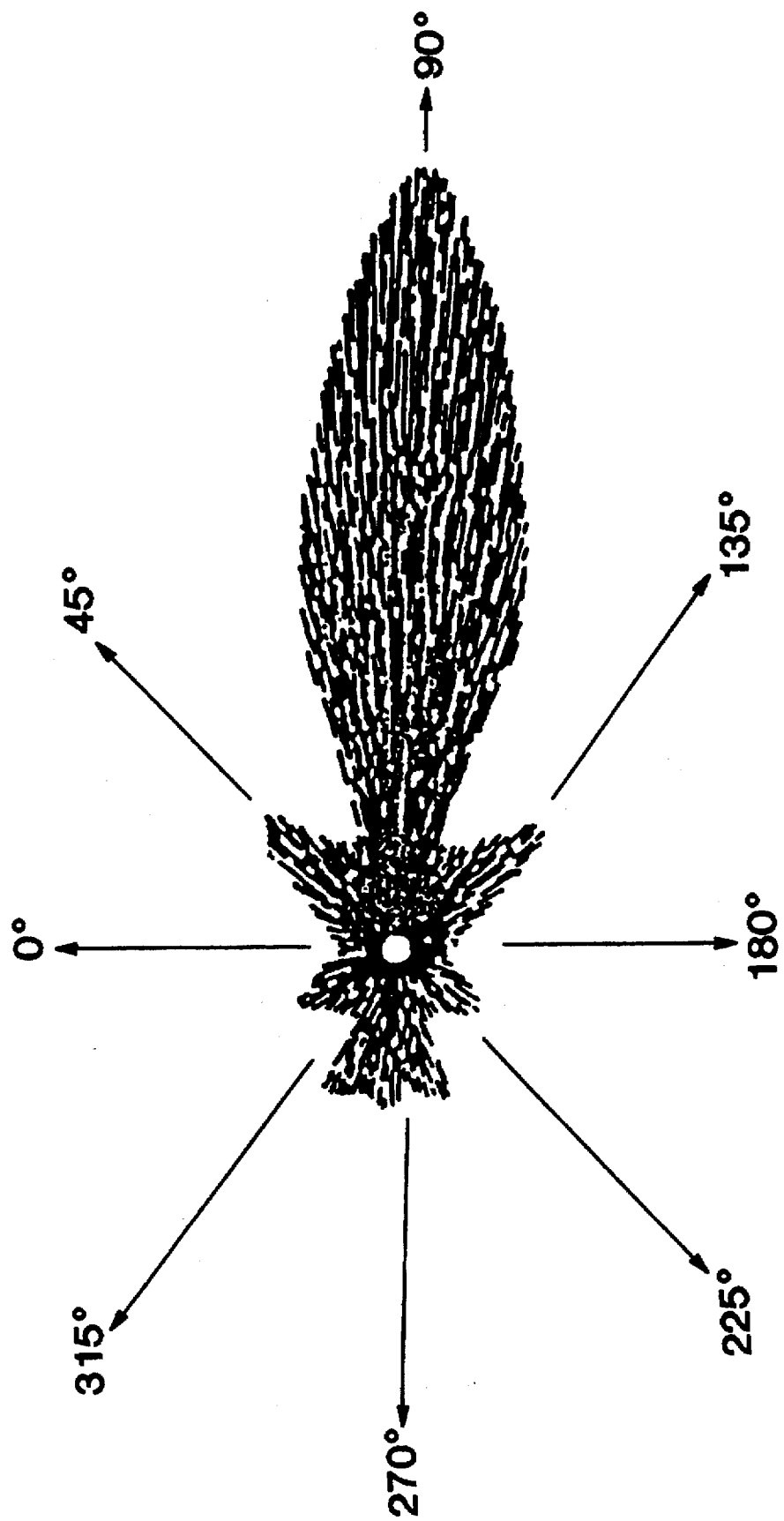
FIG. 7 is a graphical illustration of forward scattering of electromagnetic radiation by an aerosol particle.

Although ultraviolet radiation is significantly scattered by the water droplets present in the low visibility environment, it has also been discovered that a significant portion propagates and/or scatters in a substantially forward direction, as illustrated in FIG. 7, and hence is not attenuated. Also, a sufficient amount of energy propagates on-axis such that the location of its source can be determined with good resolution. There is still, however, significant attenuation in the ultraviolet region in adverse weather conditions. But the absence of any solar background radiation in that spectrum allows high-gain image tubes, such as microchannel plate tubes, to be used to localize and image the source of the radiation from the extremely low radiation detected.

Figure 8:
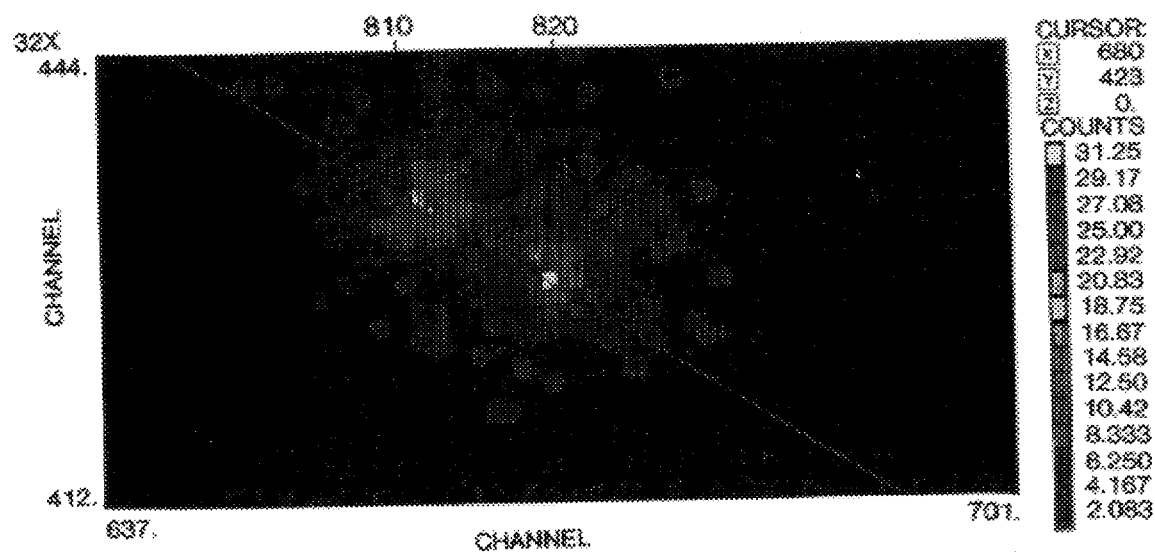
FIG. 8 is a representation of the display obtained from experimental practice for the system of FIG. 1.
Figure 9:
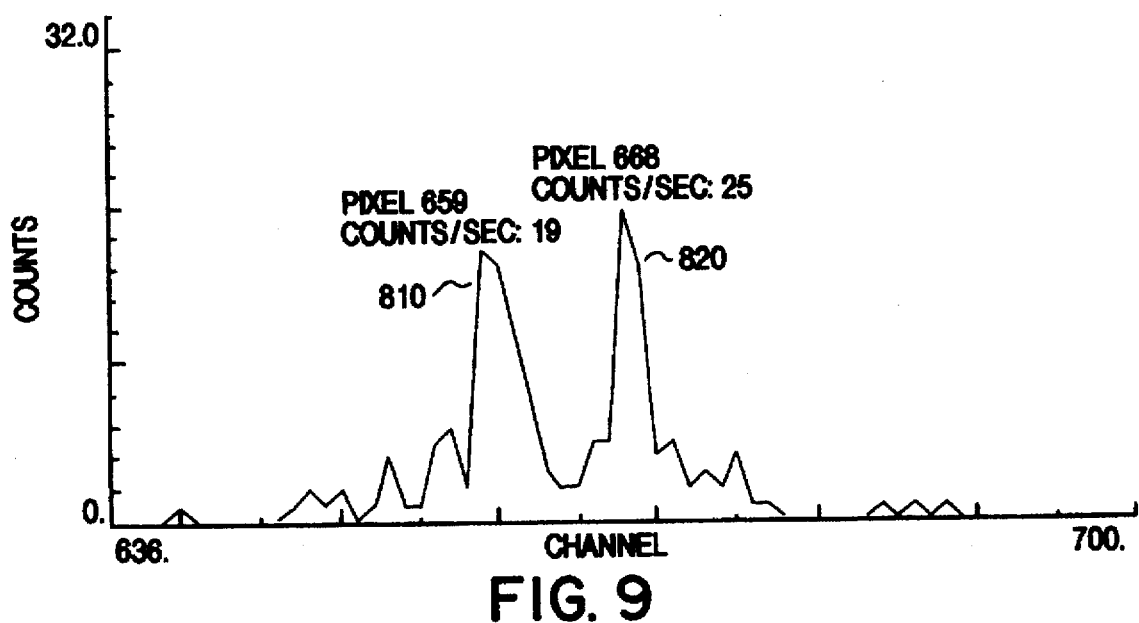
FIG. 9 is a response plot showing the angular distribution of the photon counts per second for the receiver used to obtain the display of FIG. 8.

Experimental results obtained at the airport in Williamsport, Pa. demonstrate the use of ultraviolet radiation in the solar blind region to penetrate a low visibility atmosphere. The Williamsport airport was selected for its prevailing susceptibility to dense fog situations. Under measured visibility conditions of 700 feet (measured by an FAA approved visual range meter), two tungsten halogen sources spaced six feet apart were located 2400 feet from receiver 130. These two sources were clearly and separately detected and displayed as shown in FIG. 8. The images 810 and 820 of the respective sources are not horizontal because of a misalignment of the imaging tube during the experiment. FIG. 9 provides the same results in a different format. These figures confirm that ultraviolet signal radiation propagates and/or scatters in a substantially forward direction through a low visibility atmosphere. Furthermore, the distinct separation of the two sources confirms the ability of the present invention to image with an angular resolution (~2.5 milliradians) comparable to that of the human eye, at least under those conditions.

To appreciate the advantages of the present invention, the aviation industry's current methods of dealing with visibility problems are examined. Low visibility conditions are categorized for aviation purposes by the FAA as shown in the table below.

| Weather Minima For Aircraft Landings | | |
|---|---|---|
| Category | Decision Height (ft.) | Runway Visual Range (ft.) |
| I | 200 | 2400 |
| II | 100 | 1200 |
| IIIa | 0 | 700 |
| IIIb | 0 | 150 |
| IIIc | 0 | 0 |

Each landing category has an associated runway visual range based on the distance at which an object with a 5% contrast can be detected. The precision landing equipment employed by the aircraft and the airport is certified according to their collective ability to provide guidance for safe landing under the various low visibility conditions indicated in the table. If the runway visual range becomes less than that associated with a given category of the precision landing system, that particular grade system cannot be used for the approach and landing. For example, if the pilot of an aircraft equipped with a CAT II precision landing system is on a final approach to landing and he cannot see the runway at an altitude of 100 ft, corresponding to a visual, and at a range of 1,200 ft, the pilot must execute a missed approach.

The precision landing equipment necessary to land in each category becomes progressively more complex and costly as the low visibility condition becomes more severe. Because of such expense, a very small fraction of airports and aircraft have CAT IIIa landing capability, and less than ten facilities have fully certified CAT IIIc capability. One of the advantage of the present invention lies in permitting landing in more severe adverse weather than an aircraft or airport's precision landing system capability would normally allow. For instance, commercial airlines have expressed the desire that a CAT I equipped aircraft be able to land in CAT IIIa visibility conditions. This would require the ability to see the runway at an altitude of 200 ft and a range of 2400 ft under 700 ft visibility conditions. Such a capability would provide significant economic and operational benefits since it would open up for service hundreds of airports that are now closed during adverse weather.

Figure 10:
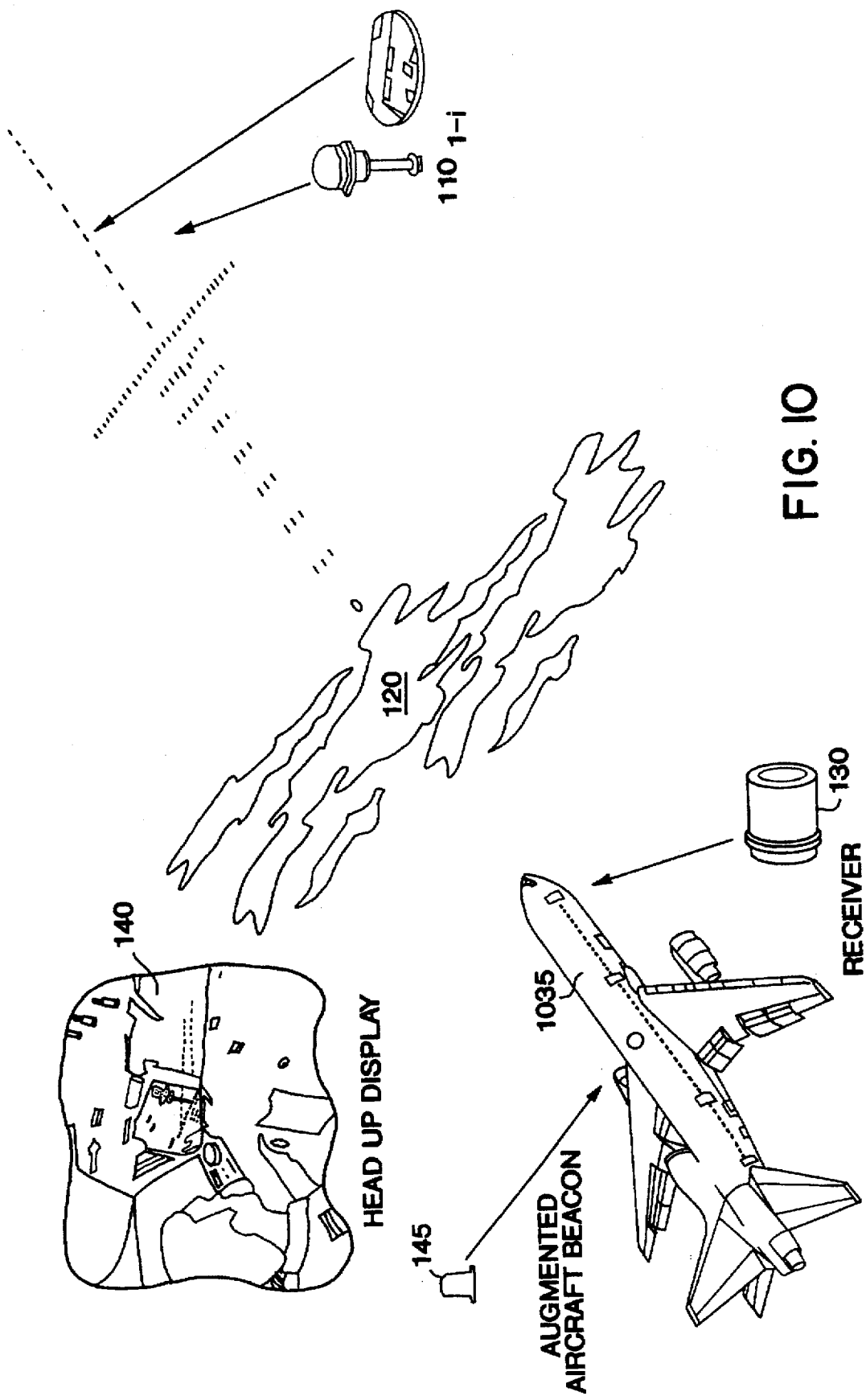
FIG. 10 is a pictorial representation of a system in accordance with the principles of the present invention.

Turning to FIG. 10, there is shown a pictorial representation of a system in accordance with the block diagrams of FIGS. 1 and 5 for facilitating aircraft landing under adverse weather conditions. Ultraviolet radiation, within the solar blind spectrum of 0.205 µm–0.275 µm, is emitted from radiation sources $110_1$–$110_i$. Sources $110_1$–$110_i$ are situated at, near or integrated with the runway edge and centerline lights. Preferably, sources $110_1$–$110_i$ are installed within the runway edge and centerline lights, such as edge runway lights Model HRLQ manufactured by Crouse-Hinds Airport Lighting Products, of Windsor, Conn. and centerline lights Model RCL-20560P2 manufactured by Sepco Aviation Lighting, Inc., of Windsor, Conn. Preferably, sources $110_1$–$110_i$ emit radiation at varying azimuth angles at a peak elevation angle of 3°.

Alternatively, the centerline and edge runway lights may be modified with lamps that advantageously emit a portion of their radiation in the desired ultraviolet region. In this manner, the runway lights function as both the visible markers and the ultraviolet sources. In some instances, the lamps may not have to be modified. Quartz tungsten halogen lamps, already in use in many runway installations, emit sufficient radiation in the ultraviolet region if operated at blackbody temperatures in the region of 3000 K°. See "Tungsten Halogen for Illumination" in *The Photonics Design and Applications Handbook* (1993). In some instances, the lamp's globe or lens, which modifies the radiation pattern, may have to be replaced with those transmissive in the ultraviolet region of interest.

The emitted ultraviolet radiation propagates through low visibility atmosphere 120 and is received by receiver 130 that is located onboard an aircraft 1035. As discussed above, receiver 130 includes solar blind imaging tube 200 (shown in FIGS. 1 and 5) capable of producing an image or spatial representation of the received radiation. Display device 140 presents to the pilot an image or representation of sources $110_1$–$110_i$. Receiver 130 may detect scattering in the form of a halo from sources that are several hundred feet away. The forward scattering property of the radiation of interest will cause the halo to be substantially concentrated about its source of origin and hence amenable to signal processing. Any of a wide variety of anti-blooming techniques well known in the art may be used to eliminate the presence of such halo effects in the image that is ultimately displayed. Such techniques allow both near and far field images to be displayed with virtually no loss in angular resolution. Image processing techniques may also be employed to accomplish automated locating and tracking for use in "out of the loop" landings.

Alternatively, the ultraviolet radiation can be emitted from an appropriate source located onboard aircraft 1035. Likewise, the ultraviolet radiation propagates through low visibility atmosphere 120 until it encounters reflectors $151_1$–$151_i$ located at, near or integrated with the runway edge and centerline lights. Reflectors $151_1$–$151_i$ reflect the incident ultraviolet radiation back through low visibility atmosphere 120. That radiation is then detected by receiver 130 which similarly produces an image or spatial representation of reflectors $151_1$–$151_i$. Again display device 140 presents an image or representation of the reflectors to the pilot. In this manner, a pilot is able to "see" the runway, even in low visibility conditions, thereby allowing him to safety land the aircraft.

Figures 11A, 11B:
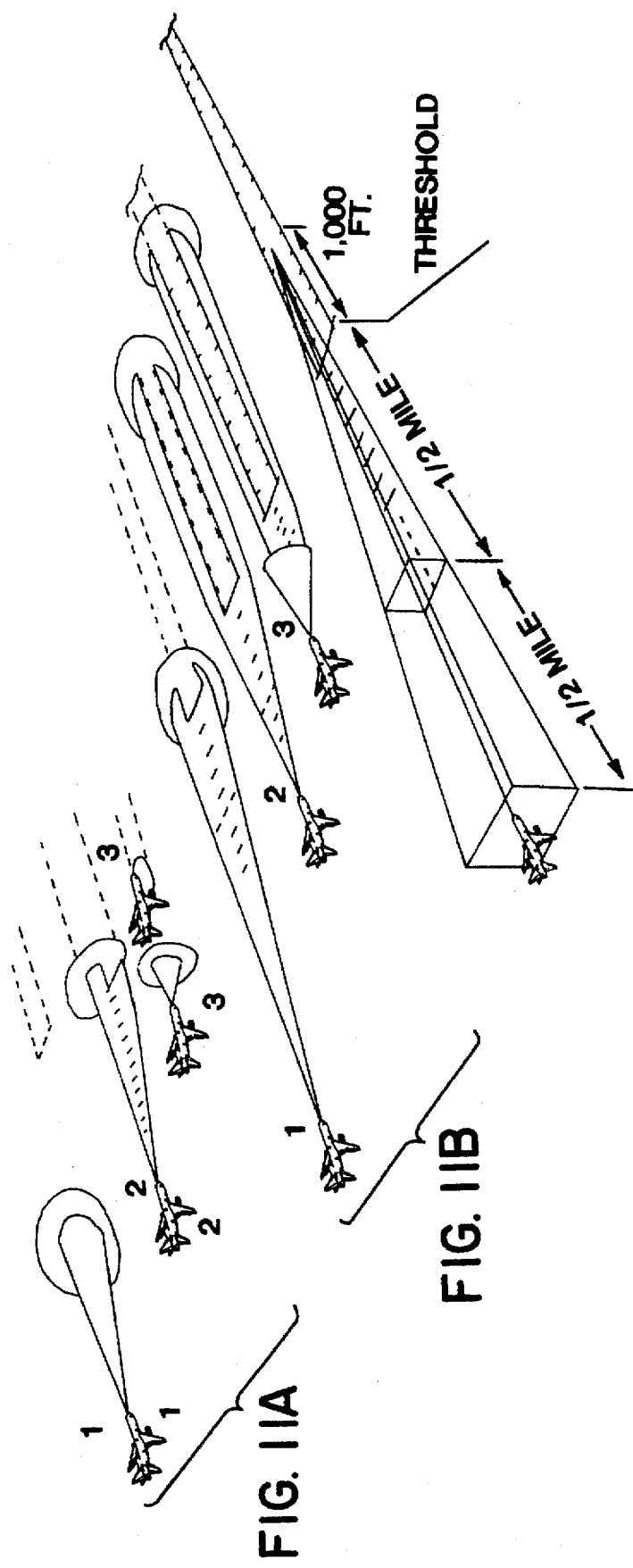
FIGS. 11A–B are pictorial representations of an aircraft attempting to land in low visibility conditions unaided and aided by the system of FIG. 1, respectively.
Figure 12A:
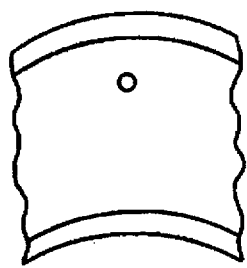
FIGS. 12A–C are illustrations of the pilot's view of the runway under low visibility conditions from distances of one mile, one half mile and one quarter mile, respectively.
Figure 12B:
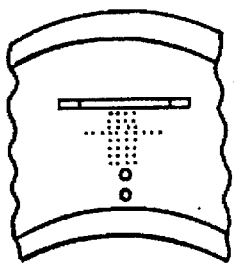
Figure 12C:
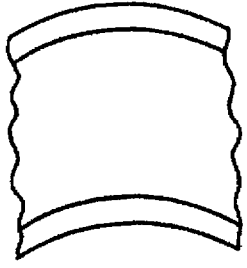

Shown in FIG. 11A is a pictorial representation of an aircraft attempting to land under one quarter mile visibility without the use of the present invention. The plane at the ranges of one mile, one half mile and one quarter mile from the runway are indicated by the numerals 1, 2 and 3, respectively. The light cone indicates the distance at which the pilot can see through the fog. The corresponding visible images available to the pilot at those respective positions are shown in FIGS. 12A–C. In this example, the pilot suddenly encounters fog at a distance of one quarter mile and his vision of the runway is obscured, as depicted in FIG. 12C.

Figure 13A:
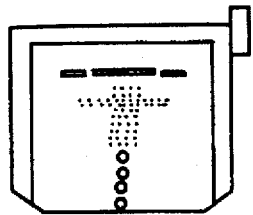
FIGS. 13A–C are illustrations of the corresponding view of FIGS. 12A–C presented to the pilot through a head-up display in accordance with the principles of the present invention.
Figure 13B:
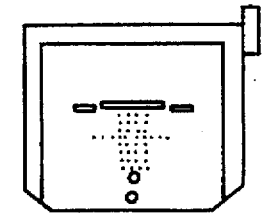
Figure 13C:
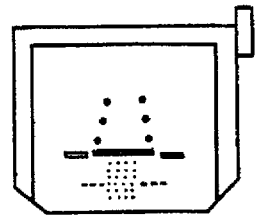

For comparison, shown in FIG. 11B is a pictorial representation of the same aircraft landing with the use of the present invention. Similarly, the numerals 1, 2 and 3 depict the plane at the same distances away from the runway as in FIG. 11A. Further, shown in FIGS. 13A–C are pictorial representations of the display seen by the pilot on display 140 at a range of one mile, one half mile, and one quarter mile, respectively. It should be noted that the pilot continues to enjoy a one mile visibility despite the sudden outset of fog.

Figure 14B:
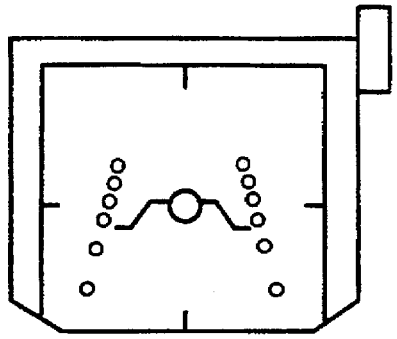
FIGS. 14A–B are illustrations of images driven by a landing guidance systems on a pilot's head-up display with and without the use of the present invention.
Figure 14A:
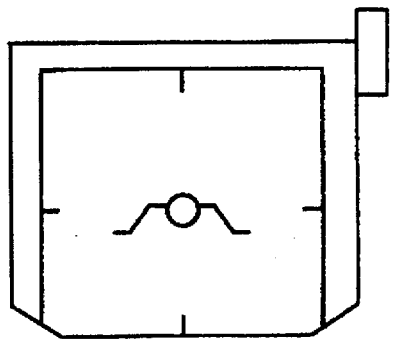

It will be apparent to those skilled in the art that the present invention may be used with current landing guidance commands generated by existing landing systems, such as GPS/GNSS, ILS or MLS. FIG. 14A shows a representation of the orientation of a flight vector generated on a head-up display that is oriented by such guidance commands. A pilot controls his aircraft such that he maintains the orientation of this vector either centered amidst the two sets of indices or circumscribed about a guidance ball. Shown in FIG. 14B is the same flight vector superimposed with an image of the actual location of the runway lights as detected by the present invention. The simultaneous display of navigation information from two distinctly different sources, provides a vital cross check during the most critical phase of flight. This cross check "unloads" a flight crew of concerns and frees them to perform other tasks, thereby enhancing safety.

Figure 15:
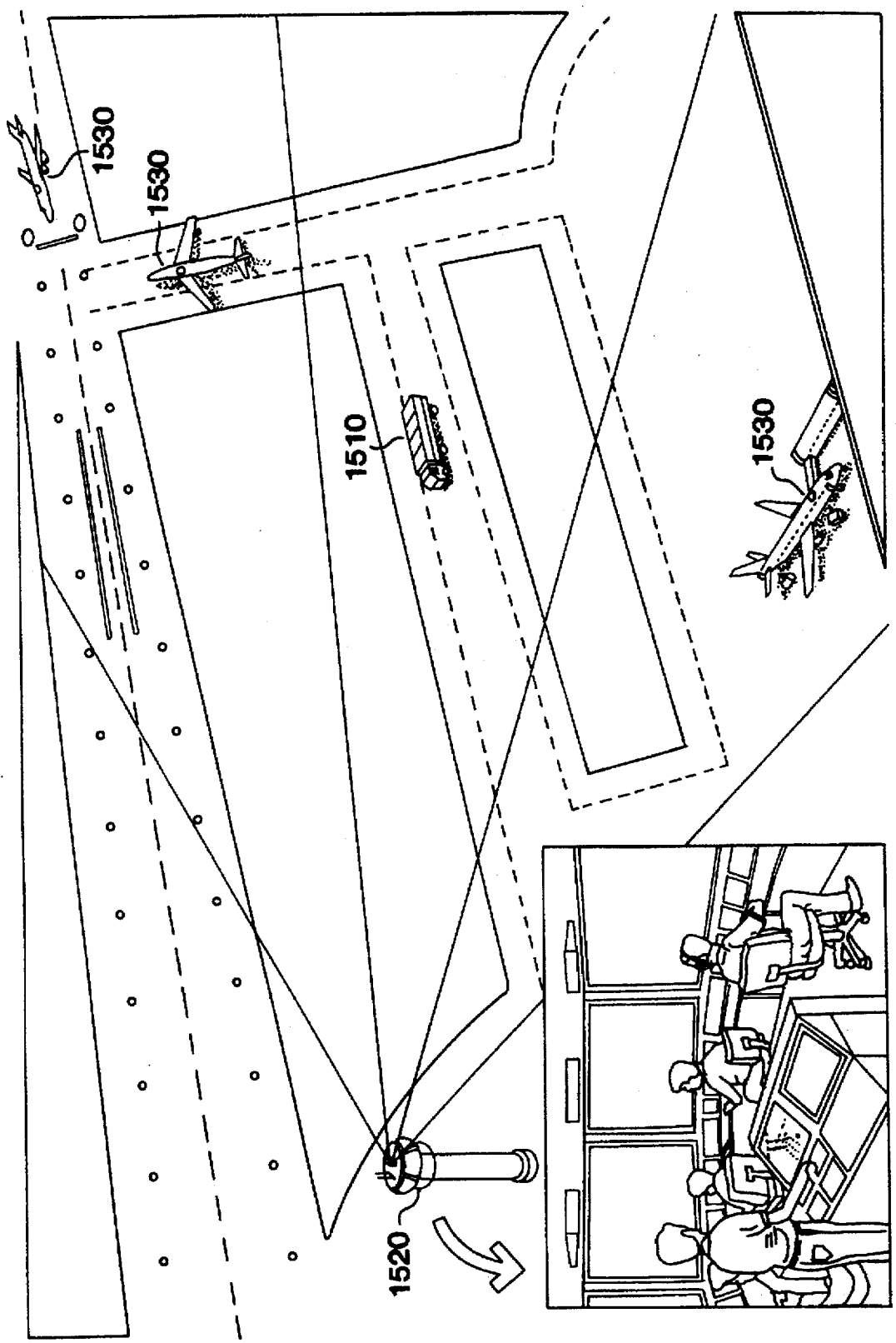
FIG. 15 is a pictorial representation of the use of a system in accordance with the principles of the present invention for monitoring ground traffic by air traffic controllers in low visibility conditions.

In another embodiment, the receiver and display can be installed in airport control towers to assist in ground surveillance during low visibility conditions. In addition to the runway beacons, ultraviolet sources can be placed on all aircraft and co-positioned or integrated with existing visible beacons (shown as beacon 145 in FIG. 10). An image of the airport runways with taxiing aircraft traffic can be presented in a head-up display to the air traffic controllers or projected onto the control tower windows. A pictorial representation of this implementation is shown in FIG. 15. Taxiing aircraft 1530 and ground vehicles 1510 are retrofitted with sources $110_1$–$110_i$. Ultraviolet radiation propagates to control tower 1520 where receiver 130 and display 140 are installed. An illustration of air traffic controllers using the images presented by the present invention to control the ground traffic is shown in the cut away view of tower 1520.

Each source can be modulated or encoded to uniquely identify each aircraft. Moreover, a video tracking box can continuously and automatically adjust its size to ensure that it completely encloses the aircraft target, yet excludes other targets from entering the box. This auto-track procedure, with a separate gate for each aircraft, provides for a performance superior to radar systems. As such, there is a low probability of cross-target capture that can occur with "track while scan" systems. Moreover, the modulated or encoded radiation may be used for "de-cluttering." Various objects and/or areas may be removed from the display by filtering out the modulated signals that are associated with those objects and/or areas.

Many control towers currently use large monitors that display a layout of the airport runways and taxiways. The location of the aircraft and ground vehicles can be superimposed onto those monitors at their appropriate location, much like weather satellite images are superimposed over a representation of the land mass. Since this display format is familiar to air traffic controllers, it facilitates the use of the present invention.

Taxiing aircraft can also use the present invention as they move to and from the runway. Ultraviolet sources co-positioned with the existing visible beacons define the taxiing paths, and ultraviolet sources co-positioned with existing aircraft beacons can inform the pilot of the presence of other aircraft. Preferably, these ultraviolet sources are pulsed xenon sources. As shown pictorially in FIG. 16, the use of the present invention by landing aircraft, taxiing aircraft, and by the control tower provides multiple deterrents to runway incursions in low visibility conditions. Receiver 130, display 140 and an aircraft beacon with an ultraviolet source are installed on taxiing aircraft 1530. This same equipment is also installed on landing aircraft 1035. Control tower 1520 likewise possesses a receiver and display. In this manner, the personnel in landing aircraft 1035, taxiing aircraft 1530 and in tower 1520 can see the moving traffic in the air and on the runways. The pilot's view in taxiing aircraft 1530 is depicted in the upper right. The runways and landing aircraft 1035 can be clearly seen. The air traffic controller, whose view is depicted in the top center can monitor both taxiing aircraft 1530 and landing aircraft 1035. The pilot of landing aircraft 1035 can clearly see the runway and the taxiing aircraft in his view, as depicted in the lower left. In this fashion, the present invention provides the potential for a three-pronged deterrent to runway incursions.

It should be understood that although the present invention is of incalculable benefit to the aviation industry, applications of the present invention are in no way limited to its use in aircraft. For instance, the system can be used to effect search and rescue. A stranded watercraft could employ an ultraviolet source or reflector to assist a search plane or boat equipped with the present invention to locate the watercraft in adverse weather.

Also, the present invention may be used to realize obstruction detection and collision avoidance. Ultraviolet sources may be co-positioned with hazard beacons which inform aircraft of the presence of buildings, radio antennae, power lines, etc. The present invention may also be used to permit navigation in dangerous terrain areas which currently present perilous situations during low visibility conditions. For example, take-offs and landings at airports in mountainous regions are presently curtailed in fog conditions because of the significant risk of aircraft collision with the terrain. However, sources, reflectors or transponders could be affixed to mountain slopes, peaks and other terrain obstacles enabling the present invention to provide their location to pilots. Such information may also be used to indicate the proper flight path in and out of the region.

A system in accordance with the present invention can also be of significant use to the maritime community. For example, it is the current practice to define preferred waterway traffic channels by using navigation buoys. A watercraft navigates in the channel by traveling within boundaries defined by buoys. These buoys are often difficult to locate amid heavy ship and boat traffic, wave swells, ground clutter and precipitation. The present invention can alleviate this navigation difficulty. Ultraviolet sources or reflectors may be placed on the buoys and a receiver installed in the watercraft. The location of the buoys can be displayed on a head-up display in the cabin of the ship, or superimposed on the cabin window. In this manner, the ship captain can identify the navigation buoy and steer his craft accordingly.

Even more advantageously, the location of the buoys may be used to annotate an existing radar display. Normally, the radar system provides the location of objects, but leaves the identification of those objects to the radar operator. Data from the present invention can be used to automatically identify the navigation buoys and present that information on the radar display, thus providing a diagram of the proper water channel to travel.

Because of the unique identification capability inherent in using modulated ultraviolet radiation, a large number of objects may be separately located and identified and annotated on the radar display, including hazard annunciators on obstacles, RACON beacons on bridges and running lights on other watercraft. Sources, preferably UV lasers, may also be co-positioned with range light elements.

Also, the present invention may be installed in automobiles. For instance, ultraviolet sources or reflectors can be placed alongside the roadside edge. A receiver and display device inside an automobile can assist a driver in maintaining his position on the roadway during dense fog conditions. Indeed, the present invention can play a role in virtually any application where it is necessary to be able to see through a low visibility environment and quickly react.

It should be understood that various other modifications will also be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

I claim:

1. A system for locating in a low visibility atmosphere an object having at least one identifying marker, said system comprising:

means co-located with said at least one identifying marker for emitting ultraviolet radiation substantially in the solar blind region that penetrates the low visibility atmosphere, wherein water present in fog causing said low visibility atmosphere interacts with and breaks down the ozone therein so as to reduce the attenuation attributable to the ozone in said atmosphere of the emitted ultraviolet radiation, said means for emitting positioned so as to establish the location of the object within a desired field of view;

means responsive to said ultraviolet radiation for creating an image of said means for emitting, said image depicting the location of said object within the desired field of view; and means for processing said image so as to remove associated radiation from objects also emitting within the solar blind region.

2. The system of claim 1 further comprising means for displaying a representation of said image.

3. The system of claim 2 wherein said means for displaying includes a head-up display wherein said representation is superimposed over a visual image of said at least one critical marker.

4. The system of claim 1 wherein said means for creating an image includes a microchannel plate photomultiplier tube.

5. The system of claim 1 further comprising means for focusing said ultraviolet radiation onto said means for creating an image.

6. The system of claim 5 wherein said means for focusing includes a lens.

7. The system of claim 1 wherein said means for processing includes a signal processor.

8. The system of claim 1 further comprising means for modulating said ultraviolet radiation in accordance with a characteristic of said at least one identifying marker.

9. The system of claim 1 wherein said means for creating an image comprises means for selectively blocking out radiation approximately above 0.275 μm.

10. The system of claim 9 wherein said means for selectively filtering includes an absorption filter.

11. The system of claim 1 wherein said means for emitting comprises means for directing the ultraviolet radiation along a predetermined solid angle of illumination and at a desired elevation.

12. The system of claim 1 wherein said at least one identifying marker includes an airport structure.

13. The system of claim 12 wherein said airport structure includes runway beacons and lights.

14. The system of claim 1 wherein said means for creating an image is located on an aircraft.

15. The system of claim 1 wherein said means for creating an image is located in a control tower.

16. The system of claim 1 wherein said means for emitting is located on an aircraft.

17. The system of claim 1 wherein said means for emitting is integrated with the structure of said least one identifying marker.

18. The system of claim 1 wherein said means for emitting is selected from a group consisting of xenon, quartz mercury, tungsten halogen or deuterium lamps.

19. The system of claim 1 wherein said means for emitting includes a laser.

20. The system of claim 19 wherein said laser is an ultraviolet laser.

21. A system for enhancing navigation in a low visibility atmosphere, wherein water present in fog causing the low visibility atmosphere interacts with and breaks down the ozone therein so as to reduce the attenuation attributable to the ozone in said atmosphere of emitted ultraviolet radiation, said system comprising:

a plurality of sources co-located with critical markers of a desired area so as to establish the location of the desired area within a desired field of view, said plurality of sources emitting ultraviolet radiation substantially in the solar blind region;

means responsive to said ultraviolet radiation for imaging said plurality of sources so as to form an image thereof showing the location of the desired area within the desired field of view; and means for displaying said image to an observer, said image providing a navigation reference.

22. The system of claim 21 further comprising means for processing said image.

23. The system of claim 21 wherein said means for imaging includes a microchannel plate photomultiplier tube.

24. The system of claim 21 further comprising means for modulating said ultraviolet radiation from said plurality of sources.

25. The system of claim 21 wherein said means for imaging includes means for blocking out radiation approximately above 0.275 μm.

26. A system for navigating in a low visibility atmosphere, wherein water present in fog causing the low visibility atmosphere interacts with and breaks down the ozone therein so as to reduce the attenuation attributable to the ozone in said atmosphere of emitted ultraviolet radiation, said system comprising:

a plurality of reflectors co-positioned with critical markers of a desired area, said critical marker fixing the location of the desired area within a desired field of view;

a source emitting radiation substantially along a direction to said plurality of reflectors, said radiation substantially within the solar blind region of the ultraviolet radiation spectrum;

means responsive to radiation reflected from said plurality of reflectors for forming an image of said plurality of reflectors depicting the location of said desired area within the desired field of view, said means for forming an image co-located with said source; and means for displaying a representation of said image, whereby said representation provides a navigation reference to an observer.

27. The system of claim 26 wherein said means for forming an image comprises an optical filter having a bandpass region substantially between 0.205 μm–0.275 μm.

28. The system of claim 26 wherein said plurality of reflectors includes retroreflectors.

29. The system of claim 26 further comprising means for processing said image.

30. The system of claim 26 wherein said means for forming an image includes a microchannel plate photomultiplier tube.

31. The system of claim 26 further comprising means for modulating said ultraviolet radiation from said source.

32. The system of claim 26 further comprising means for modulating said ultraviolet radiation reflected from said plurality of reflectors.

33. The system of claim 26 wherein said means for forming an image includes means for electronically filtering out signals corresponding to radiation substantially between 0.205–0.270 µm and having a desired modulation.

34. The system of claim 26 further comprising means for gating such that backscattering for the radiation from said source is substantially reduced.

35. A system for use in a low visibility atmosphere, wherein water present in fog causing the low visibility atmosphere interacts with and breaks down the ozone therein so as to reduce the attenuation attributable to the ozone in said atmosphere of emitted ultraviolet radiation, said system comprising:

a plurality of transponders co-positioned with critical markers of a desired area, said critical markers positioned so as to establish the location of the desired area within a desired field of view;

a source emitting a first radiation substantially along a direction to said plurality of transponders, said transponders in response to said first radiation emitting a second radiation, said first and second radiation within the solar blind region of the ultraviolet radiation spectrum; and means responsive to said second radiation for forming an image of said plurality of transponders depicting the location of the desired area within the desired field of view, said means for forming an image co-located with said source.

36. The system of claim 35 wherein said first and second radiation have different wavelengths.

37. The system of claim 35 further comprising means for displaying a representation of said image, whereby said representation provides a navigation reference to an observer.

38. The system of claim 35 wherein said means for displaying includes a head-up display.

39. The system of claim 35 wherein said means for forming an image includes a microchannel plate photomultiplier tube.

40. The system of claim 35 further comprising means for processing said image for removing radiation associated with objects emitting in the solar blind region.

41. The system of claim 35 further comprising means for modulating said second radiation in accordance with characteristics of said critical markers.

42. The system of claim 35 wherein said means for forming an image comprises means for selectively blocking out radiation approximately above 0.275 µm.

43. The system of claim 35 wherein said critical markers include an airport structure.

44. The system of claim 43 wherein said airport structure includes runway beacons and lights.

45. The system of claim 35 wherein said means for forming an image is located on an aircraft.

46. The system of claim 35 wherein said means for forming an image is located in a control tower.

47. A method for locating in a low visibility atmosphere an object having at least one identifying marker, said method comprising the steps of:

co-positioning with said at least one identifying marker of a desired area a source for emitting ultraviolet radiation substantially in the solar blind region that penetrates the low visibility atmosphere, wherein water present in fog causing said low visibility atmosphere interacts with and breaks down the ozone therein so as to reduce the attenuation attributable to the ozone in said atmosphere of the emitted ultraviolet radiation, said at least one identifying marker establishing the location of the desired area within a desired field of view;

forming an image of said source from radiation received therefrom, said image showing the location of the desired area within the desired field of view; and displaying a representation of said image.

48. The method of claim 47 further comprising the step of superimposing said representation of said image over an actual visual image of said at least one critical marker.

49. The method of claim 47 further comprising the step of processing said image.

50. The method of claim 47 further comprising the step of modulating said ultraviolet radiation in accordance with a characteristic of said at least one identifying marker.

51. The method of claim 47 wherein said step of forming an image includes the step of blocking out radiation approximately above 0.275 µm.

52. The method of claim 47 wherein the source for emitting ultraviolet radiation is a laser.

53. A method for navigating in a low visibility atmosphere, wherein water present in fog causing said low visibility atmosphere interacts with and breaks down the ozone therein so as to reduce the attenuation attributable to the ozone in the atmosphere of emitted ultraviolet radiation, said method comprising the steps of:

co-positioning a plurality of reflectors with critical markers of a desired area, said critical markers establishing the location of the desired area within a desired field of view;

emitting radiation from a source substantially along a direction to said plurality of reflectors, said radiation substantially within the solar blind region of the ultraviolet radiation spectrum;

forming from radiation reflected from said plurality of reflectors an image thereof depicting the location of the desired area within the desired field of view; and displaying a representation of said image, whereby said representation provides a navigation reference to an observer.

54. The method of claim 53 wherein said step of forming an image includes the step of blocking out radiation approximately above 0.275 µm.

55. The method of claim 53 further comprising the step of processing said image.

56. The method of claim 53 further comprising the step of modulating the ultraviolet radiation from said source.

57. The method of claim 53 further comprising the step of modulating the ultraviolet radiation reflected from said plurality of reflectors.

* * * * *